United States Patent [19]

EerNisse et al.

[11] Patent Number: 4,724,351
[45] Date of Patent: Feb. 9, 1988

[54] DOUBLE RESONATING BEAM FORCE TRANSDUCER WITH REDUCED LONGITUDINAL PUMPING

[75] Inventors: Errol P. EerNisse, Salt Lake County, Utah; Walter P. Kistler, King County, Wash.

[73] Assignee: Quartex, Inc., Salt Lake City, Utah

[21] Appl. No.: 692,569

[22] PCT Filed: Apr. 1, 1983

[86] PCT No.: PCT/US83/00471

§ 371 Date: Nov. 14, 1984

§ 102(e) Date: Nov. 14, 1984

[87] PCT Pub. No.: WO84/03998

PCT Pub. Date: Oct. 11, 1984

[51] Int. Cl.$^4$ .............................................. H01L 41/08
[52] U.S. Cl. ..................... 310/328; 310/338; 310/348; 310/367; 310/312
[58] Field of Search ............... 310/328, 338, 348, 367, 310/368, 312; 73/862.59

[56] References Cited

U.S. PATENT DOCUMENTS

| 4,215,570 | 8/1980 | EerNisse | 310/367 |
|---|---|---|---|
| 4,321,500 | 3/1982 | Paros et al. | 310/338 |
| 4,384,495 | 5/1983 | Paros | 73/862.59 |
| 4,469,979 | 9/1984 | Chuang . | |
| 4,535,638 | 8/1985 | EerNisse et al. | 310/338 |

FOREIGN PATENT DOCUMENTS 050307 10/1981 European Pat. Off. .

OTHER PUBLICATIONS

"Second-Mode Tuning Forks for High Frequencies: Finite Element Analysis and Experiments," IEE Transactions on Sonics and Ultrasonics, vol. Su-27, No. 5, Sep. 1980, Yoshiro Tomikawa, et al., pp. 253–257.
"The Torsional Tuning Fork as a Temperature Sensor," 36th Annual Frequency Control Symposium-1982, R. J. Dinger, pp. 265–269.
"A Quartz Crystal Tuning Fork with Modified Basewidth for a High Quality Factor: Finite Element Analysis and Experiments," IEE Transactions on Sonics and Ultrasonics, vol. SU-29, No. 6, Jul. 1982, Yoshiro Tomikawa, et al., pp. 217–223.
"Force Sensor Using Double-Ended Tuning Fork Quartz Crystals," 37th Annual Frequency Control Symposium, Jun. 1983, Shih S. Chuang.

Primary Examiner—Patrick R. Salce
Assistant Examiner—Emanuel Todd Voeltz
Attorney, Agent, or Firm—Seed and Berry

[57] ABSTRACT

A double resonator beam force transducer configured to minimize longitudinal pumping by making the beams vibrate symmetrically. This can be accomplished by making the boundary conditions of the beams symmetrical or, if the boundary conditions are nonsymmetric, then by biasing the beams inwardly or outwardly to compensate for the nonsymmetrical boundary conditions of the beams. In the nonsymmetrical case where the beams would bow outwardly at their fundamental resonant frequency or an odd overtone thereof, an inward bias is provided to minimize longitudinal pumping. In the nonsymmetrical case where the beams would bow inwardly at an even overtone of the fundamental resonant frequency, an outward bias is provided to minimize longitudinal pumping. The inward or outward bias is provided in various embodiments by bowing the beams inwardly or outwardly, placing masses on the inner or outer edges of the beams, or tapering the inner or outer edges of the beams so that the width of the beams increase toward their midpoints.

36 Claims, 19 Drawing Figures

NON-SYMETRICAL MOVMENT

SYMETRICAL MOVMENT

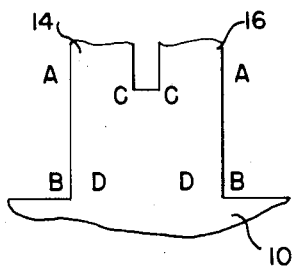
FIG. 4
FIG. 5
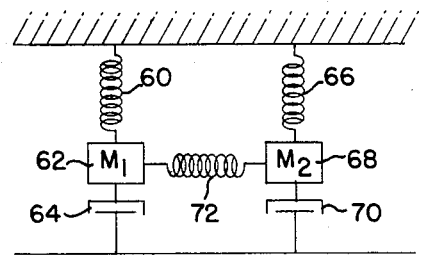
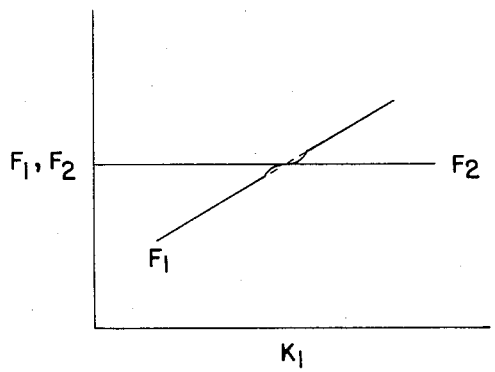
FIG. 6A
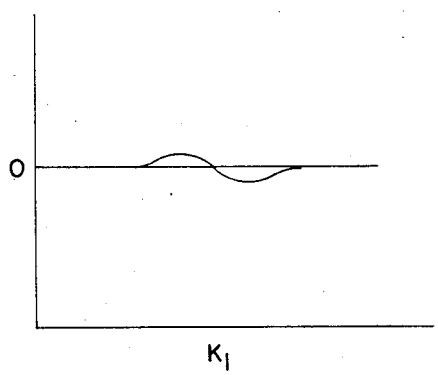
FIG. 6B

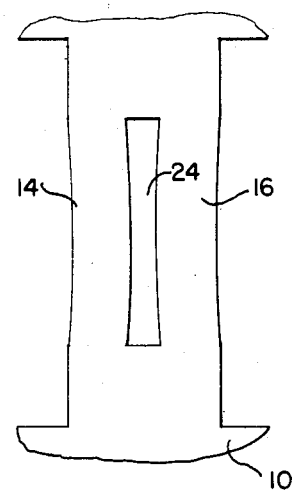
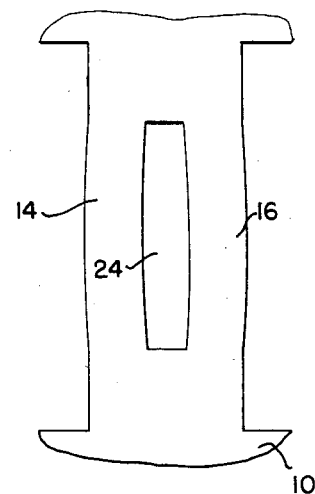
FIG. 7A    FIG. 7B
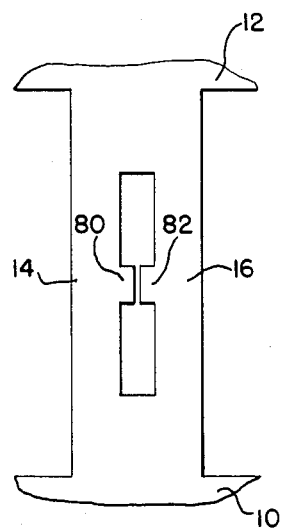
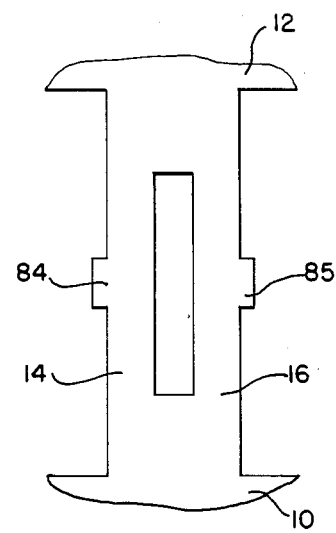
FIG. 8A    FIG. 8B

DOUBLE RESONATING BEAM FORCE TRANSDUCER WITH REDUCED LONGITUDINAL PUMPING

DESCRIPTION

1. Technical Field

This invention relates to force transducers having double resonating beams extending between mounting pads, and more particularly, to a force transducer configured so that its beams vibrate inwardly and outwardly on opposite sides of a straight mean position in order to minimize the magnitude of longitudinal forces applied to the mounting pads by the beams.

2. Background Art

Double-beam resonators have been proposed for use as a force transducer to measure such physical properties as pressure, weight or acceleration. When used as a force transducer, a pair of substantially parallel beams extend from respective mounting pads. Since the mounting pads form stationary nodes, the mounting pads may theoretically be connected to a force-transmitting structure without the movement of the beams being coupled to such structure. Coupling of motion from the beams to the force-transmitting structure would absorb energy from the beams and thus degrade the quality factor or "Q" of the resonator.

One problem associated with double resonant beam force transducers that has not be adequately recognized is the coupling of energy from the beams to the force-transmitting structure because of longitudinal movement of the mounting pads toward and away from each other resulting from deflection of the beams. Longitudinal movement or "pumping" occurs because the distance between the mounting pads varies as the beams deflect from side to side. This longitudinal pumping is undesirable not only for its degrading of the Q of the transducer, but also because it degrades the linearity of the transducer. This nonlinearity arises when the resonant frequency of the beams at a certain force approaches the resonant frequency of the force-transmitting structure either alone or in combination with the mounting pads between which the beams extend. As a result, when the response of the force transducer is linearized using appropriate formulae, there is a residual error at certain values of applied force. The magnitude of the error depends upon the nature of the resonance in the surrounding structure, and it can range from relatively small values such as $2.5 \times 10^{-5}$ to relatively large values such as $2.5 \times 10^{-3}$ of full scale.

If the resonance of the surrounding structure could be accurately predicted, the longitudinal pumping phenomena would not present an insurmountable problem. This is because the surrounding support structure could be configured to have a resonance outside the resonant frequency of the beams in their normal range of operation. However, the resonances in the support structure tend to be very complicated, because the structures are physically large compared to the dimensions of the force transducer. For example, the double-beam force transducer typically vibrates at between 17 kHz and 40 kHz, depending on the specific design. The fundamental resonance of the support structure is typically in the 1 kHz range. Thus, resonant frequencies of the surrounding structure in the 17 kHz–40 kHz range are fairly high overtones of the fundamental, so that the mode spectrum of the support structure is very dense at the operating frequency of the resonator. These higher order resonant modes typically involve flexural, torsional and extensional distortions which cannot be readily identified, controlled or predicted. Thus, it is impractical to design a support structure having a well-controlled mode spectrum at the operating frequency of the force transducer. The ideal solution would be to have a support structure having no resonances over the entire operating range of the force transducer. However, since the operating frequency of a force transducer with zero force frequency of 40 kHz typically varies from 36 kHz to 44 kHz as the force varies from full scale compression to full scale tension, it is not possible to do so.

The degree of nonlinearity caused by longitudinal pumping is, to a large extent, a function of the magnitude of the longitudinal pumping. Thus, a reduction in the longitudinal pumping increases the linearity of the relationship between the resonant frequency of the beams and the calculated applied force. It will be apparent that the movement of the mounting pads in a longitudinal direction (i.e., toward and away from each other) is a function of the degree of lateral deflection of the beams. Thus, when the beams are initially deflected laterally from a straight position, the degree of relative longitudinal movement of the mounting pads is relatively slight. However, as the beams continue to deflect laterally, the rate at which the mounting pads move longitudinally toward each other drastically increases. In short, the relative longitudinal movement of the mounting pads for a given lateral deflection increases as the beams deflect laterally.

It has not heretofore been recognized that nonsymmetrical boundary conditions at the junctions between the beams and the mounting pads causes the mean position of the beams to bow outwardly during vibration at the fundamental resonant frequency of the beams or at odd overtones thereof. Nor has it been recognized that these nonsymmetrical boundary conditions cause the beams to bow inwardly during vibration at even overtnes of the fundamental resonant frequency of the beams. As a result, the beams do not bow inwardly and outwardly by equal amounts, but instead have a mean position to one side or the other. Therefore, for a given peak-to-peak lateral deflection of the beams, the maximum lateral position of the beams for nonsymmetrical end conditions is substantially greater than for symmetrical conditions in which the degree of inward and outward movement of the beams is equal. The nonsymmetrical boundary conditions, by producing a relatively large lateral deflection, produce a relative large amount of longitudinal movement or "pumping".

The phenomena of longitudinal motion imparted to a mounting pad has been addressed for tuning fork resonators used as time standards, such as in quartz watches. Thus, for example, the tines of such tuning forks can be modified as shown in Tomikawa, et al., *A Quartz Crystal Tuning Fork with Modified Basewidth for a High Quality Factor: Finite Element Analysis and Experiments*, IEEE Transactions on Sonics and Ultrasonics, Vol. SU-29, No. 6, July 1982; Tomikawa, et al., Second-Mode Tuning Forks for High Frequencies: Finite Element Analysis and Experiments, IEEE Transactions on Sonics and Ultrasonics, Vol. SU-27, No. 5, September 1980. However, the teachings of these references are not applicable to double-beam resonators for several reasons. First, the beams of a double-beam resonator deflect in a significantly different manner than do the tines of a tuning fork. A tuning fork tine deflects like a fixed-free cantilever beam. In contrast, the beam of a double-beam resonator deflects like a fixed-fixed built-in beam. Each of these beams has a different node pattern and resonating characteristic, thus each given structural change affects each beam differently. Second, since the tines of a tuning fork are free at one end, the longitudinal motion imparted by the tines to the mounting pad is not a function of variations in the effective length of the tines as in the case of a doublebeam resonator. Instead, longitudinal motion is caused by inertia: i.e., the longitudinal component of the tine's movement. In effect, the tine's center of mass is moving toward and away from the mounting pad as it resonates laterally. In contrast, longitudinal pumping in double-beam resonators does not result from inertia. In fact, if the beams had zero mass, longitudinal pumping would still exist since the effective length of the beams would still vary.

DISCLOSURE OF THE INVENTION

It is an object of the invention to provide a double resonating beam force transducer having improved force-induced frequency response characteristics.

It is another object of the invention to provide a double resonating beam force transducer having a relatively high quality factor.

It is still another object of the invention to provide a double resonating beam force transducer that can be used with a support structure without the need to control spurious resonances in the support structure.

These and other objects of the invention are provided by a force transducer having a pair of parallel beams of substantially equal length extending between a pair of mounting pads which receive the forces to be measured. The force transducer is specially configured so that the beams resonate equally inwardly and outwardly about a straight mean position. In one configuration of the force transducer, the beams are bowed inwardly toward each other in order to reduce longitudinal pumping for the fundamental and odd overtones of the resonant frequency of the beams. Conversely, the beams bow outwardly away from each other to reduce longitudinal pumping for even overtones of the resonant frequency of the beams. In another configuration, the beams carry respective masses along a lateral edge at their midpoints, the inside edge being used to reduce longitudinal pumping for fundamental and even overtones of the resonant frequency of the beams and the outer edge being used to reduce longitudinal pumping for even numbered overtones of the resonant frequency. In another configuration, the width of the beams is increased toward their midpoints, with the inside edges bowing inwardly for fundamental and odd overtones of the resonant frequency and the outer edges bowing outwardly for even overtones of the resonant frequency.

In still another embodiment of the inventive force transducer, the boundary conditions of the beams at their junction with the mounting pads are configured so that the boundary conditions are symmetrical so that straight beams of uniform width can be used.

BRIEF DESCRIPTION OF THE DRAWINGS

FIG. 4 is a plan view of the junction between the beams of the force transducer and one mounting pad, provided for the purpose of illustrating a major cause of longitudinal pumping.

FIG. 5 is a schematic representing the condition in which the resonating beams are coupled to a resonant support structure of the force transducer.

FIGS. 6A and 6B are graphs showing the frequency response of the illustrative system of FIG. 5 as a function of the resonant frequency determining spring constant of one resonant structure and a graph of the error produced by coupling between the resonant structures shown in FIG. 5.

FIGS. 7A and 7B are plan views of one embodiment of a configuration for causing the beams to deflect inwardly and outwardly in equal amounts about a straight mean position in which the beams are bowed inwardly or outwardly.

FIGS. 8A and 8B are plan views; of another embodiment of a configuration for causing the beams to deflect inwardly and outwardly in equal amounts about a straight mean position in which the each beam carries a mass at its midpoint on either the inner or outer edge thereof.

BEST MODE FOR CARRYING OUT THE INVENTION

Figure 1:
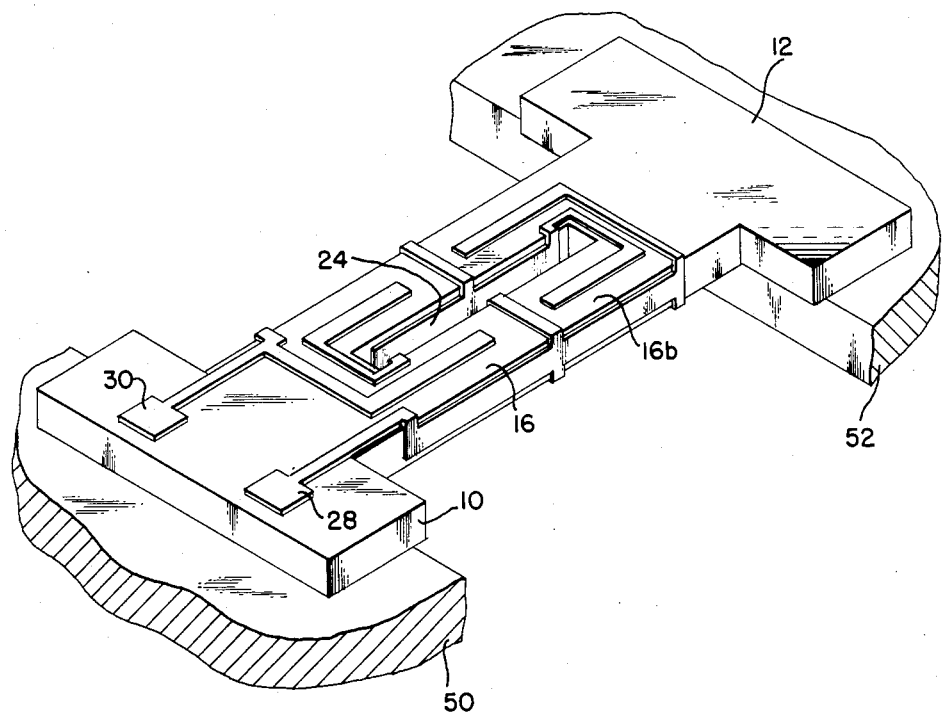
FIG. 1 is an isometric view of a typical double resonating bar force transducer.

A double resonating beam force transducer, as illustrated in FIG. 1, includes two mounting pads 10,12 having a pair of generally parallel beams 14,16 extending therebetween. The beams 14,16 are separated from each other by a slot 24. The force transducer is preferably formed from a piezoelectric material, such as quartz. Electrodes 28,30, in the form of films or coatings, extend onto the beams 14, 16, as shown in the drawing. The electrodes 28,30 are connected to a conventional oscillator 32 which applies an AC signal to the electrodes 28,30, which makes the beams 14,16 vibrate inwardly and outwardly 180° out of phase from each other. The frequency of the AC signal applied to the electrodes 28,30 is determined by the resonant frequency of the beams 10,12.

The mounting pads 10,12 are mounted on respective support structures 50,52, which are typically significantly more massive than the mounting pads 10,12. Longitudinal forces (i.e., forces acting along the longitudinal axis of the beams 14,16) are applied to the mounting pads 10,12 through the support structures 50,52 to cause the resonant frequency of the beams 14,16 to vary. The support structure 50,52 thus act as force-transmitting means. The resonant frequency increases responsive to tensional forces applied to the beams 14,16 and decreases responsive to compressive forces applied to the beams 14,16.

As mentioned above, the resonating beams 14,16 move laterally (i.e., from side to side) at 180° from each other so that they are simultaneously moving either inwardly or outwardly. As a result, the rotational moments that the beams 14,16 apply to the mounting pads 10,12 are theoretically equal and opposite each other. The mounting pads 10,12 thus act as stationary nodes and, therefore, theoretically do not couple energy from the beams 14,16 to the support structure 50,52. It is important that energy not be coupled to the support structure, since energy transferred from the beams 14,16 reduces the quality factor of "Q" of the force transducer with a resulting degradation in performance.

Although the mounting pads 10,12 acting as stationary nodes are fairly effective in preventing rotational moments and lateral forces from being applied to the support structure 50,52, they do not prevent all energy transfer from the beams 14,16 to the support structure 50,52. This is because deflection of the beams 14,16 causes the mounting pads 10,12 to be pulled toward each other. Thus, lateral movement of the beams 14,16 causes longitudinal forces to be applied between the mounting pads 10,12. This "longitudinal pumping" causes energy to be transferred from the beams 14, 16 to the support structure 50,52 through the mounting pads 10,12. When the frequency of this longitudinal pumping approaches the resonant frequency of higher order modes in the support structure 50,52, the operating frequency of the force transducer 4 is pulled to such resonant frequency. This adversely affects the linearity of the frequency versus force relationship, thereby degrading accuracy.

Figure 2A:
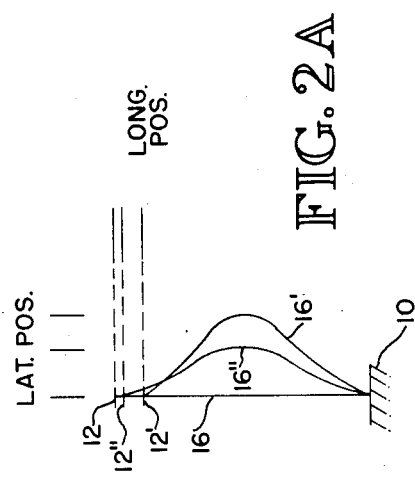
FIGS. 2A and 2B are schematics illustrating the manner in which longitudinal forces are generated by the beams as a function of the lateral deflection of the beams.

Although longitudinal pumping cannot be entirely eliminated, the magnitude of the longitudinal pumping depends to a large extent on the nature of the lateral movement of the beams 14,16. With reference to FIG. 2A, a beam 16 is shown schematically in three positions during resonance. Position 16 is its innermost position, 16' is its outermost position and 16" is the midpoint or mean position.

Figure 2B:
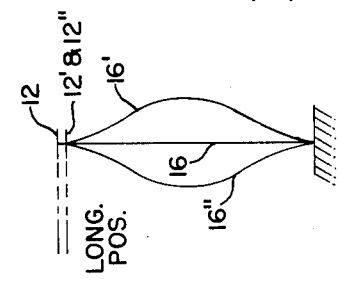

It will be apparent from 2A that the longitudinal position of the beam midpoint varies in disproportion to the lateral portion of the beam 16. Thus, the longitudinal position of the beam at 16' has moved substantially more than twice its position at 16" even though the lateral position at 16' is only twice that at 16". The degree of longitudinal pumping for a beam deflecting inwardly and outwardly in equal amounts is substantially less, as illustrated in FIG. 2B. Thus, if the beams 14,16 can be made to deflect inwardly and outwardly in substantially equal amounts so that the means or average position of the beams 14,16 is straight, the magnitude of the longitudinal pumping can be minimized.

Figure 3A:
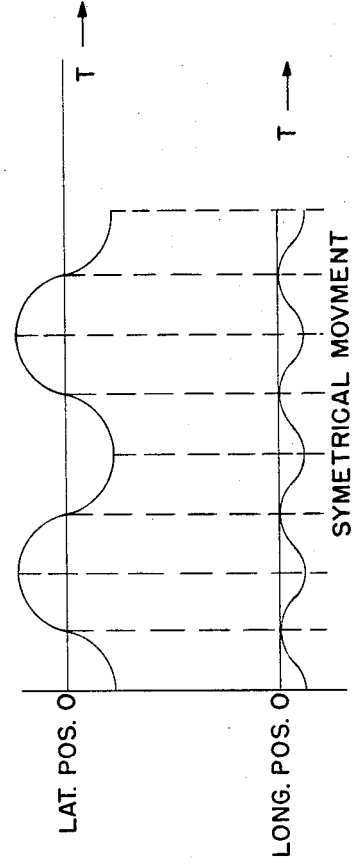
FIGS. 3A and 3B are graphs plotting lateral displacement of the midpoint of a beam and longitudinal displacement of the end of a beam as a function of time for a curved mean lateral position of the beam and for a straight mean lateral position for a dual-beam force transducer having one end fixed and the other end free.
Figure 3B:
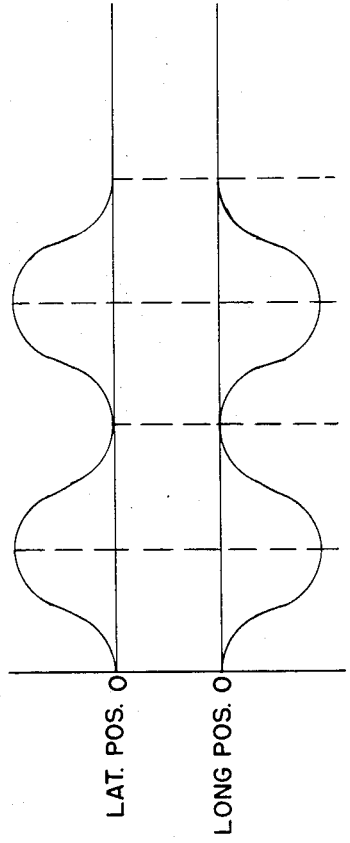

The movement of the beams 14,16 for the nonsymmetrical and symmetrical conditions is plotted as a function of time in FIG. 3. In FIG. 3A, the beams 14,16 are moving, as shown in FIG. 2A, from the straight or zero lateral position outwardly to a positive lateral position, as shown in the top waveform of FIG. 3A. This nonsymmetric lateral movement causes the ends of the beams to move longitudinally toward each other of the same frequency as the operating frequency, as shown in the lower waveform of FIG. 3A. In contrast, for the same degree of symmetric lateral movement about a straight mean position shown in the top of FIG. 3B, the magnitude of the longitudinal movement or pumping is substantially less. Also, of course, the frequency of the longitudinal pumping in FIG. 3B is twice that of the operating frequency of the force transducer since the beams 14,16 move through the straight position twice each cycle.

The reason for the tendency of the beams 14,16 to resonate nonsymetrically, as illustrated in FIG. 2A, is the nonsymmetrical boundary conditions of the beams 14,16 at their junction with the mounting pads 10,12. The interface between the beams 14,16 and mounting pad 10 is illustrated in greater detail in FIG. 4. It will be noted that the boundary conditions for the beam 16 adjacent the mounting pad 10 are not symmetric in that no material is present in the region A-B while tuning fork material is present in the region C-D on the opposite side of the beam 16. As a result, the restoring force in the outward direction produced by the material in the region C-D is greater than the restoring force in the inward direction because of the absence of any material in the region A-B. This asymmetry of boundary conditions causes the average or mean position of the beams 14,16 to bow outwardly during operation at the fundamental resonant frequency of the beams 14,16 or odd overtones of the fundamental resonant frequency. Although it is not intuitively obvious, for even overtones of the fundamental resonant frequency, the beams 14,16 swing inwardly further than they swing outwardly so that the average or mean position of the beams 14,16 bows inwardly.

As mentioned above, coupling between the beams 14,16 and the supporting structure 50,52 resulting rom longitudinal pumping not only degrades the Q of the force transducer, but is also adversely affects the linearity of the frequency response as a function of applied force. This phenomena can be better understood with reference to the schematic of FIG. 5. As illustrated in the drawing, a first resonant structure consisting of spring 60, mass 62 and damper 64 is coupled to a second resonator structure consisting of spring 66, mass 68 and damper 70 by spring 72. The frequency of resonance of each structure is given by the formula:

$$F = (\tfrac{1}{2}\pi)(K/M)^{\frac{1}{2}}$$

For illustrative purposes, assume that the characteristics of the spring 66, mass 68 and damper 70 of the structure on the right-hand side of FIG. 5 are fixed. Also assume that the mass 62 and damper 64 on the left-hand side are also fixed, but the spring constant of spring 60 is adjustable so that the resonant frequency of the resonant structure of the left-hand side of FIG. 5 is adjustable. As a result, the resonant frequency of the structure on the left-hand side of FIG. 5 would vary in a smooth curve as the spring constant K varies. However, with the coupling provided by spring 72, the resonant frequency of the structure on the left-hand is pulled toward the resonant frequency of the structure on the right-hand side, as illustrated in the graph of FIG. 6A in which the resonant frequency $F_1$ of the structure on the left and the resonant frequency $F_2$ of the structure on the right are plotted as a function of the spring constant K of spring 60.

The resonant structure on the left-hand side of FIG. 5 represents the double resonant beam force transducer in which the spring constant K varies in accordance with the applied force. The resonant structure on the right-hand side of FIG. 5 represents the support structure for the force transucer in a simplistic form, since, in reality, the support structure has a large number of highly unpredictable and uncalculable resonances. The spring 72 represents the coupling between the beams 14,16 and the support structure 50,52 resulting from longitudinal pumping of the force transducer. As a result, the frequency of oscillation of the force transducer does not vary as a smooth function of the applied force, but is instead pulled toward the various resonant frequencies of the support structure. Each time this phenomenon occurs, a residual error occurs, such as shown in FIG. 6B for the simplified system of FIG. 5. The residual error has a region of positive and then negative values as the force applied to the force transducer varies.

While the error shown in FIG. 6B cannot be entirely eliminated, it can be greatly reduced by reducing either the degree of coupling between the beams 14,16 and the support structures 50,52 or by reducing the magnitude of longitudinal pumping. As illustrated in FIGS. 2 and 3, the longitudinal pumping can be minimized by configuring the beams 14,16 so that they deflect substantially equally inwardly and outwardly.

One configuration for configuring the beams 14,16 to minimize longitudinal pumping is illustrated in FIG. 7. In the embodiment of FIG. 7, the beams 14,16 are initially curved in the opposite direction from the average curvature they would assume in operation because of the nonsymmetrical boundary conditions. Since the beams 14,16 resonate about a mean position curving outwardly in the case of operation at the fundamental or odd overtones of the fundmental resonant frequency, the beams 14,16 may be configured to minimize longitudinal pumping by bowing the beams 14,16 inwardly, as illustrated in FIG. 7A. It has been calculated and determined experimentally that the gap 24 between the beams 14, 16 at the midpoint should be narrower than the width of the gap 24 at either end by about 2 percent to 3 percent of a width of a beam 14,16. The optimum configuration is for the midpoint of the gap 24 to be narrower than the end of the gap 24 by about 2.5 percent of the width of a beam 14,16.

Insofar as the even overtones of the fundamental resonant frequency cause the beams 14,16 to bow inwardly, the congifuation of FIG. 7B, in which the beams 14,16 bow outwardly, can be used to minimize longitudinal pumping at the even overtones of the fundamental resonant frequency. The gap 24 at the midpoint should be wider than the gap 24 at either end by approximately 11 percent to 15 percent of the width of each beam 14,16. The optimum configuration is for the gap 24 at the midpoint to be wider than the gap 24 at either end by about 13 percent of the width of the beams 14,16.

Another configuration for causing the beams 14,16 to resonate symmetrically is shown in FIG. 8. In the embodiment of FIG. 8A, a lumped mass 80,82 is formed on the inner edge of each beam 14,16 at their midpoints such that the centers of mass of the beams 14,16 are shifted inwardly. By shifting the center of mass inwardly, the masses 80,82 compensate for the tendency of the beams 14, 16 to bow outwardly when the force transducer is operating at the fundamental resonant frequency or an odd numbred overtone of the resonant frequency. For even overtones of the fundamental resonant frequency, masses 84,86 are formed on the outer edge of the beams 14,16 at their midpoints. The masses 84, 86 shift the centers of mass of the beams 14,16 outwardly to compensate for the inward bowing of the beams 14,16 at even overtones of the fundamental resonant frequency.

Figure 9A:
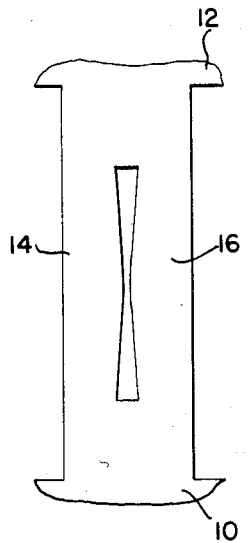
FIGS. 9A and 9B are plan views. of another embodiment of configuration for causing the beams to deflect inwardly and outwardly in equal amounts about a straight mean position in which the widths of the beams increase toward their midpoints by tapering either the inner or outer edges of the beams.
Figure 9B:
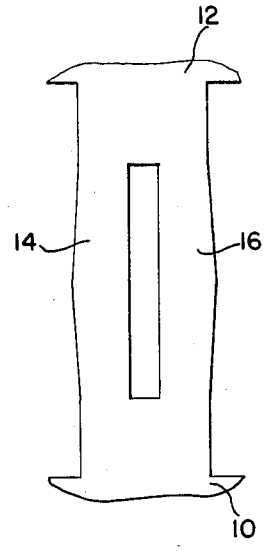

Although the embodiment of FIG. 8 utilizes discrete masses 80-86 positioned on the edges of the beams 14,16, the masses may also be distributed along the edges, as illustrated in FIG. 9. Thus, in the embodiment of FIG. 9A, the inner edges of the beams 14,16 are tapered inwardly, although the outer edges are straight. As a result, the centers of mass of the beams are shifted inwardly to counteract the tendency of the beams 14,16 to bow outwardly at the fundamental resonant frequency and odd overtones of the fundamental resonant frequency. The increased material along the inner edges of the beams, 14,16 also causes the beams 14,16 to act somewhat like inwardly bowed beams, such as illustrated in FIG. 7A.

For even numbered overtones of the fundamental resonant frequency, the mass may be distributed on the outer edges of the beams 14,16 to correspond to the masses 84,86 in FIG. 8B and somewhat assume the shape of outwardly bowed beams, such as illustrated in FIG. 7B.

Figure 10:
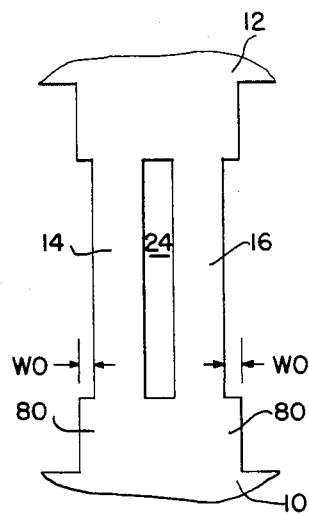
FIG. 10 is a plan view of another embodiment for causing the mean lateral positions of the beams to deflect inwardly and outwardly in equal amounts about a straight mean position by configuring the boundary conditions of the beams so that they are symmetrical on either sides of the beams.
Figure 11:
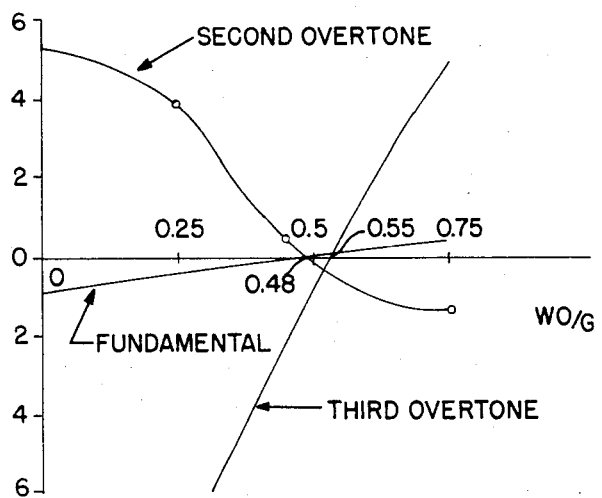
FIG. 11 is a graph showing the degree of longitudinal pumping as a function of mounting pad geometry for operating frequencies at the fundamental, second and third overtones of the resonant frequencies of the beams.

Rather than configure the beams 14,16 for minimum longitudinal pumping by changing the shape or mass distribution of the beams, longitudinal pumping can be minimized by making the boundary conditions of the beams symmetrical, such as illustrated in FIG. 10. Making the boundary conditions at the ends symmetric causes the beams to swing equally inwardly and outwardly for operation at the fundamental resonant frequency as well as at any even or odd overtone thereof. In the embodiment illustrated in FIG. 10, a lateral projection or "outrigger" 80 is provided to supply an inward restoring force that equalizes the outward restoring force provided by the portions of the mounting pads 10,12 beneath the gap 24. It can be shown that the optimum width $W_0$ of the outrigger 80 is approximately half the width of the gap 24. The magnitude of the pumping motion at the resonant frequency for various widths $W_0$ of the outrigger 80 as a function of the width the gap 24 is illustrated in FIG. 11. It can be seen from FIG. 11 that the outrigger width $W_0$ of one-half of the w of the gap 24 is close to the optimum value for the second and third overtones of the resonant frequency as well as the fundamental resonant frequency.

Figure 12A:
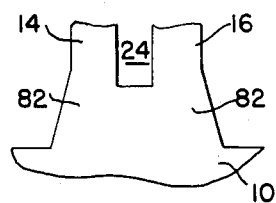
FIGS. 12A and 12B are other embodiments for causing the beam to deflect inwardly and outwardly in equal amounts about a straight mean position by making the boundary condit ions of the beams symmetrical.
Figure 12B:
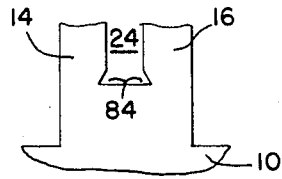

Although one configuration for making the boundary conditions of the beams 14,16 fork symmetrical has been illustrated in FIG. 10, it will be understood that other configurations may be used, including, without limitation, the embodiments in FIG. 12. As illustrated in FIG. 12A, the outriggers 80 of FIG. 10 may be replaced by tapered supports 82 which provide an inward restoring force that is equal in magnitude to the outward restoring force provided by the base mounting pads 10,12 beneath the gap 24. In the embodiment of FIG. 13B, the beams 14,16 are notched at 84 to reduce the outward restoring force imparted to the beams 14,16 by the mounting pads 10,12.

It is thus seen that the effects of longitudinal pumping can be minimized utilizing any of the embodiments expalined above and illustrated in the drawings. As a result of this reduced longitudinal pumping, the quality factor "Q" and linearity of double resonating beam fork force transducers are greatly improved.

We claim:

1. A double-beam resonator having reduced longitudinal pumping, comprising a pair of generally parallel, spaced-apart beams of substantially equal length extending between a pair of supports and including means for causing said beams to resonate in opposite lateral directions, said supports having a lateral dimension that is greater than the distance between the outer edges of said beams so that at least a portion of said supports extend laterally beyond the outer edges of said beams, said supports extending from respective mounting pads having a lateral dimension that is greater than the lateral dimension of said supports such that said mounting pads extend laterally beyond the outer edges of said supports, said supports providing inward restoring forces to said beams to cause said beams to resonate inwardly and outwardly in substantially equal amounts about mean positions that are substantially straight, thereby minimizing the lateral deviation of said beams from said mean position in order to minimize the longitudinal pumping of said beams.

2. A double-beam resonator having reduced longitudinal pumping, comprising a pair of generally parallel beams of substantially equal length extending between a pair of mounting pads and including means for causing said beams to resonate in opposite lateral directions, said beams bowing inwardly toward each other at their midpoints to cause said beams to resonate inwardly and outwardly in substantially equal amounts about mean positions that are substantially straight, thereby minmizing the lateral deviation of said beams from said mean position in order to minimize the longitudinal pumping of said beams.

3. The resonator of claim 2 wherein the spacing between said beams at their midpoints is less than the spacing between said beams at their ends by about 2 percent to 3 percent of the width of each beam.

4. The resonator of claim 3 wherein the spacing between said beams at their midpoints is less than the spacing between said beams at their ends by about 2.5 percent of the width of each beam.

5. A double-beam resonator having reduced longitudinal pumping, comprising a pair of generally parallel beams of substantially equal length extending between a pair of mounting pads and including means for causing said beams to resonate in opposite lateral directions, said beams bowing outwardly away from each other at their midpoints to cause said beams to resonate inwardly and outwardly in substantially equal amounts about mean positions that are substantially straight, thereby minimizing the lateral deviation of said beams from said mean position in order to minimize the longitudinal pumping of said beams.

6. The resonator of claim 5 wherein the spacing between said beams at their midpoints is greater than the spacing between said beams at their ends by about 11 percent to 15 percent of the width of each beam.

7. The resonator of claim 6 wherein the spacing between said beams at their midpoints is greater than the spacing between said beams at their ends by about 13 percent of the width of each beam.

8. A double-beam resonator having reduced longitudinal pumping, comprising a pair of generally parallel beams of substantially equal length extending between a pair of mounting pads and including means for causing said beams to resonate in opposite lateral directions, said beams each carrying a mass at its midpoint along one lateral edge thereof to cause said beams to resonate inwardly and outwardly in substantially equal amounts about mean positions that are substantially straight, thereby minimizing the lateral deviation of said beams from said mean position in order to minimize the longitudinal pumping of said beams.

9. The resonator of claim 8 wherein said masses are carried on the inside edges of respective beams, thereby minimizing longitudinal pumping when said resonators operate at the fundamental resonant frequency of said beams or an odd overtone thereof.

10. The resonator of claim 8 wherein said masses are carried on the outside edges of said respective beams, thereby minimizing longitudinal pumping when said resonators are operated at even overtones of the fundamental resonant frequency of said beams.

11. A double-beam resonator having reduced longitudinal pumping, comprising a pair of generally parallel beams of substantially equal length extending between a pair of mounting pads and including means for causing said beams to resonate in opposite lateral directions, the width of each beam becoming greater toward the midpoint thereof to cause said beams to resonate inwardly and outwardly in substantially equal amounts about mean positions that are substantially straight, thereby minimizing the lateral deviation of said beams from said mean position in order to minimize the longitudinal pumping of said beams.

12. The resonator of claim 11 wherein each of said beams has an inside edge that tapers inwardly at its midpoint toward the other beam in order to minimize longitudinal pumping when said resonator is operating at the fundamental resonant frequency of said beams or odd overtones thereof.

13. The resonator of claim 11 wherein each of said beams has an outside edge that tapers outwardly at its midpoint away from the other beam in order to minimize longitudinal pumping when said resonator is operating at an even overtone of the fundamental resonant frequency of said beams.

14. A double-beam resonator having reduced longitudinal pumping, comprising a pair of generally parallel beams of substantially equal length extending between a pair of mounting pads and including means for causing said beams to resonate in opposite lateral directions, each of said mounting pads extending laterally beyond the outer edges of said beams a distance approximately equal to half the lateral distance between said beams to increase the inward restoring force exerted on said beams by said mounting pads to offset the outward restoring force exerted on said beams by said mounting pads, thereby causing said beams to resonate inwardly and outwardly in substantially equal amounts about mean positions that are substantially straight in order to minimize the longitudinal pumping of said beams.

15. A double-beam resonator having reduced longitudinal pumping, comprising a pair of generally parallel beams of substantially equal length extending between a pair of mounting pads and including means for causing said beams to resonate in opposite lateral directions, the outer edges of said beams tapering outwardly as they join said mounting pads to provide inward restoring forces to said beams to offset the outward restoring forces applied to said beams by said mounting pads, thereby causing said beams to resonate inwardly and outwardly in substantially equal amounts about mean positions that are substantially straight in order to minimize the longitudinal pumping of said beams.

16. A double-beam resonator having reduced longitudinal pumping, comprising a pair of generally parallel beams of substantially equal length extending between a pair of mounting pads and including means for causing said beams to resonate in opposite lateral directions, the inside edge of each of said beams having formed therein a notch at each end thereof to reduce the outward restoring force exerted on said beams by said mounting pads, thereby causing said beams to resonate inwardly and outwardly in substantially equal amounts about mean positions that are substantially straight in order to minimize the longitudinal pumping of said beams.

17. The resonator of claim 1, further including a pair of support structures on which respective mounting pads are mounted, said support structures being adapted to apply an externally generated force to said beams acting along the longitudinal axes of said beams so that said external force alters the resonant frequency of said beams.

18. A force transducer, comprising:
a pair of spaced-apart mounting pads;
a pair of supports extending from respective mounting pads, said supports having lateral dimensions that are smaller than the lateral dimensions of said mounting pads such that said mounting pads extend laterally beyond the edges of said supports;
a pair of substantially parallel, spaced-apart beams of substantially equal length extending between said supports, said supports having a lateral dimension that is greater than the distance between the outer edges of said beams so that said supports extend laterally beyond the outer edges of said beams, said supports providing inward restoring forces to said beams, thereby causing said beams to resonate inwardly and outwardly in substantially equal amounts so that they have mean positions that are substantially parallel to each other, thereby minimizing the lateral deflection of said beams from said mean position for a given magnitude of peak-to-peak lateral deflection;
force-transmitting means for coupling an external force to said mounting pads acting along the longitudinal axes of said beams; and
drive means for causing said beams to resonate in opposite directions at a frequency determined by the magnitude of the longitudinal force applied to said beams.

19. A force transducer, comprising:
a pair of spaced-apart mounting pads;
a pair of substantially parallel beams of substantially equal length extending between said mounting pads, said beams bowing inwardly at their midpoints, thereby causing said beams to resonate inwardly and outwardly in substantially equal amounts when said beams are resonating at their fundamental resonant frequency or an odd overtone thereof;
force-transmitting means for coupling an external force to said mounting pads acting along the longitudinal axes of said beams; and
drive means for causing said beams to resonate in opposite directions at a frequency determined by the magnitude of the longitudinal force applied to said beams.

20. The force transducer of claim 19 wherein the spacing between said beams at their midpoints is less than the spacing between said beams at their ends by about two percent to three percent of the width of each base.

21. A force transducer, comprising:
a pair of spaced-apart mounting pads;
a pair of substantially parallel beams of substantially equal length extending between said mounting pads, said beams bowing outwardly away from each other at their midpoints, thereby causing said beams to resonate inwardly and outwardly in substantially equal amounts when said beams are resonating at even overtones of the fundamental resonant frequency of said beams;
force-transmitting means for coupling an external force to said mounting pads acting along the longitudinal axes of said beams; and
drive means for causing said beams to resonate in opposite directions at a frequency determined by the magnitude of the longitudinal force applied to said beams.

22. The force transducer of claim 21 wherein the spacing between said beams at their midpoints is greater than the spacing between said beams at their ends by about 11 percent to 15 percent of the width of each beam.

23. A force transducer, comprising:
a pair of spaced-apart mounting pads;
a pair of substantially parallel beams of substantially equal length extending between said mounting pads, a mass mounted or each of said beams, said mass being symmetrically positioned at the midpoints of corresponding edges of said beams, said masses being mounted on the inside edges of said beams for operation of said beams at the fundamental resonant frequency thereof or an odd overtone thereof, and on the outer edges of said beams for operation at an even overtone of the fundamental resonant frequency of said beams;
force-transmitting means for coupling an external force to said mounting pads acting along the longitudinal axes of said beams; and
drive means for causing said beams to resonate in opposite directions at a frequency determined by the magnitude of the longitudinal force applied to said beams.

24. The force transducer of claim 18 wherein the mounting characteristics of said beams from said mounting pads are laterally symmetrical so that the inward restoring force applied to said beams by said mounting pads is equal to the outward restoring force applied to said beams by said mounting pads.

25. In a double resonating beam force transducer having a pair of beams connected between a pair of mounting pads, a method of minimizing the longitudinal pumping produced by said beams, comprising biasing said beams in directions opposite to the mean positions that said beams would otherwise assume when resonating at the fundamental resonant frequency of said beams or an overtone thereof.

26. The method of claim 25 wherein said beams are biased inwardly to minimize longitudinal pumping of said beams when said beams are resonating at the fundamental resonant frequency of said beams or an odd overtone thereof.

27. The method of claim 25 wherein said beams are biased outwardly to minimize longitudinal pumping of said beams when said beams are operating at an even overtone of the fundamental resonant frequency of said beams.

28. In a quartz crystal microresonator of the type including first and second stem portions, a pair of integral tines extending between said stem portions, a slot between said tines, said slot having opposed crotches where said tines join said stem portions, and a plurality of electrodes mounted on each so said tines, spaced along the length thereof, said electrodes being adapted for receipt of an AC voltage for causing said tines to oscillate, the improvement wherein each of said tines has a pair of opposed shoulders where said tines join said stem portions and wherein the widths of said shoulders at said opposite ends of said tines are approximately equal and approximately equal to one-half of the width of said crotches.

29. The resonator of claim 1 wherein the side edges of said supports taper inwardly from said mounting pads to the outer edges of said beams.

30. The resonator of claim 1 wherein said supports are rectangularly shaped.

31. The resonator of claim 30 wherein the lateral dimensions of said rectangularly shaped supports are substantially equal to the sum of the distance between the outer edges of said beams and the distance between the inner edges of said beams so that said supports extend laterally beyond said beams by a distance of one-half the distance between the inner edges of said beams.

32. The resonator of claim 18 wherein the side edges of said supports taper inwardly from said mounting pads to the outer edges of said beams.

33. The resonator of claim 18 wherein said supports are rectangularly shaped.

34. The resonator of claim 33 wherein the lateral dimensions of said rectangularly shaped supports are substantially equal to the sum of the distance between the outer edges of said beams and the distance between the inner edges of said beams so that said supports extend laterally beyond said beams by a distance of one-half the distance between the inner edges of said beams.

35. A double-beam resonator having reduced longitudinal pumping, comprising a pair of generally parallel, spaced-apart beams of substantially equal length extending between a pair of mounting pads and including means for causing said beams to resonate in opposite lateral directions, said mounting pads having lateral dimensions substantially equal to the sum of the lateral distance between the outer edges of said beams and the lateral distance between the inner edges of said beams such that said mounting pads extend laterally beyond the edges of said beams by a distance of approximately one-half the lateral distance between the inner edges of said beams.

36. A double-beam resonator having reduced longitudinal pumping, comprising a pair of generally parallel, spacedapart beams of substantially equal length extending between a pair of mounting pads and including means for causing said beams to resonate in opposite lateral directions, said mounting pads having lateral dimensions that are greater than the lateral distance between the outer edges of said beams so that at least a portion of said mounting pads extends laterally beyond the outer edges of said beams, the side edges of said mounting pads tapering inwardly to the outer edges of said beams.

* * * * *